(12) United States Patent
Harres et al.

(10) Patent No.: US 7,715,670 B2
(45) Date of Patent: May 11, 2010

(54) LENSED BIDIRECTIONAL, CO-LOCATED LASER/DETECTOR

(75) Inventors: Daniel N. Harres, Belleville, IL (US); Samuel I. Green, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/126,003

(22) Filed: May 10, 2005

(65) Prior Publication Data
US 2006/0257072 A1 Nov. 16, 2006

(51) Int. Cl.
*G02B 6/32* (2006.01)
(52) U.S. Cl. ........................................ 385/33
(58) Field of Classification Search ............ 385/33
See application file for complete search history.

(56) References Cited

U.S. PATENT DOCUMENTS 5,666,448 A * 9/1997 Schoenwald et al. ........ 385/44
5,757,994 A * 5/1998 Schoenwald et al. ........ 385/44
5,809,187 A 9/1998 Peck, Jr. et al.
5,894,534 A 4/1999 Peck, Jr.
6,219,477 B1 * 4/2001 Peck, Jr. ..................... 385/34
2003/0152336 A1 * 8/2003 Gurevich et al. ............ 385/88

OTHER PUBLICATIONS

U.S. Appl. No. 10/788,987, filed Sep. 1, 2005, Harres et al.

* cited by examiner

*Primary Examiner*—Uyen-Chau N Le
*Assistant Examiner*—Hoang Tran
(74) *Attorney, Agent, or Firm*—Harness, Dickey & Pierce, P.L.C.

(57) ABSTRACT

A bidirectional fiber-optic transceiver with lower optical loss than previous beam-splitters or fiber couplers and a method of implementing the same. Preferably, the transceivers can operate in both directions using a single-wavelength of electromagnetic radiation.

13 Claims, 2 Drawing Sheets

LENSED BIDIRECTIONAL, CO-LOCATED LASER/DETECTOR

STATEMENT REGARDING FEDERALLY SPONSORED RESEARCH OR DEVELOPMENT

This invention was made with Government support under N00019-04-C-0005 awarded by the United States Navy. The Government has rights in this invention.

FIELD

The present disclosure relates generally to fiber optic transceivers and, more particularly, to fiber optic transceivers that both transmit and receive optical signals using the same optical port.

BACKGROUND

Fiber optic links are quite useful for transferring high bandwidth data between components that may be quite distant from each other. Examples of these links include data communication trunks, intranets, and (even lately) flight control systems. With regard to the use of fiber aboard aircraft, and other mobile platforms, fiber optic technology allows large amounts of targeting, navigation, communication, command, and control data to be shared with the pilot thereby allowing the pilot increased situational awareness.

Generally, fiber technology provides a higher bandwidth capability than conventional, copper wire systems. However, fiber technology has been constrained in its use because the fiber optic transceivers currently available can transmit or receive data on one fiber, but can not do both on that one fiber without incurring significant performance penalties (e.g. loss of bandwidth or signal strength) or complicating the design of the transceivers and the overall system.

Thus, for every bidirectional communication need in which simplicity and performance are desired, the transceivers at the ends of the link must have one optical port for transmitting data signals and a second optical port for receiving data signals. Further, the duplication of parts (primarily optical fibers and connectors) extends along the length of the link. Each direction of the link therefore requires a complete set of cables and connectors when only one cable assembly is used with transceivers that transmit and receive optical signals from a single port.

If either performance or system simplicity can be sacrificed, then existing bidirectional fiber optic links that are more complex or have more loss can be used. These links fall into two categories. The first category of bidirectional link uses two different wavelengths (one for each direction) and dichroic mirrors (mirrors that transmit or reflect based on the wavelength) or, perhaps, a wavelength splitter to combine and split the signals traveling in the two directions with low loss. This approach has the disadvantages of requiring multiple wavelengths for the same link and of complicating the system configuration. More particularly, on one side of the link, the transmitter operates at a first wavelength with the receiver at the other end also operating at the first wavelength. For the return link, the transmitter operates at a second wavelength with the receiver operating at the second wavelength. Thus, for each bidirectional link, two pairs of transmitters and receivers must be supplied with each pair operating at separate distinct wavelengths.

The second type of bidirectional link uses free space or fiber beamsplitters at each end to manage (combine or separate) the incoming and outgoing optical signals. This type of link uses only a single wavelength, but it wastes half the available optical power at the transmitter (at one end of the link) and another half of the available optical power at the receiver (at the other end of the link). Thus, only 25% of the available transmitted power can be received at best. As a result, the signal to noise ratio, or the bandwidth, of the link decreases accordingly.

SUMMARY

It is in view of the above problems that the present disclosure was developed. The disclosure provides bidirectional fiber optic transceivers and couplers.

A number of benefits occur from being able to transmit fiber optic signals from, and to, a fiber optic device over a single fiber. In particular, the number of interconnects and cables are halved. This significantly improves the cost, weight, and reliability of the overall fiber optic system. In addition, certain types of Built-In Test (BIT) functions that were impractical before the conception of the present disclosure can be implemented that further improve system and link performance.

A co-owned, co-pending U.S. patent application Ser. No. 10/788,987, entitled BIDIRECTIONAL, CO-LOCATED LASER/DETECTOR, filed on Feb. 27, 2004, and incorporated herein as if set forth in full, discloses bidirectional fiber optic links that can be operated over a single cable assembly by using co-located sources and optical detectors. U.S Pat. No. 5,894,534 and entitled Fiber Optic "T" Coupler Single Path Transceiver and U.S. Pat. No, 5,809,187 and entitled Multi-Port Network Using Passive Optical Couplers, both assigned to The Boeing Company disclose additional fiber optical couplers and are incorporated herein as if set forth in full. The present disclosure provides improved bidirectional source/detectors by, inter alia, allowing the use of off-the-shelf detectors and transmitters. Further, the source/detectors (or transceivers) provide more efficient use of available signal power resulting in higher signal-to-noise ratios than previously available with bidirectional source/detectors.

In one embodiment, the present disclosure provides an optical coupler including a port, an objective lens and an optical source. The objective lens and the port are spaced apart along the principal axis of the lens. A first portion of the objective lens is optically coupled with the port and receives a first optical signal from the port. The source is coupled with a second portion of the lens (which may overlap an outer periphery of the first portion of the lens) and transmits a second optical signal to the second portion of the lens. From there the objective lens couples the second optical signal to the port. Preferably, the source includes a laser, possibly coupled via a fiber pigtail and a lens to collimate the output radiation, or the fiber may be omitted with the use of a laser with a pre-aligned collimating lens. Optionally, a detector may be included to detect the first signal. A second lens may also be optically coupled between the objective lens and the detector.

In another embodiment, the present disclosure provides a method of transmitting and receiving optical signals. The method includes spacing apart an objective lens (that has a first and a second portion that can overlap) and an optical port along a principal axis of the objective lens. The first portion of the objective lens is coupled with the port to receive a first optical signal. Also, the method includes optically coupling an optical source with the second portion of the objective lens so that, when the source transmits an optical signal to the objective lens, the lens couples the transmitted signal to the port. A collimated optical source illuminates the second portion of the objective lens, and a detector is used to detect the first optical signal.

In another embodiment, the present disclosure provides an optical coupler that includes three ports and a lens. The lens is optically coupled with the first port and receives electromagnetic radiation from the first port that is traveling in a first direction from the first port toward the second port. Also, the lens is optically coupled with the third port and receives electromagnetic radiation traveling generally in a second direction from the third port to the first port. Further, the third port is configured in such a manner that the electromagnetic radiation from the third port is either overlapping, adjacent to, or set apart, from the electromagnetic radiation traveling in the first direction.

Further features and advantages of the present disclosure, as well as the structure and operation of various embodiments of the present disclosure, are described in detail below with reference to the accompanying drawings.

The accompanying drawings, which are incorporated in and form a part of the specification, illustrate exemplary embodiments of the present disclosure and together with the description, serve to explain the principles of the disclosure. In the drawings.

DETAILED DESCRIPTION OF THE VARIOUS EMBODIMENTS

Figure 1:
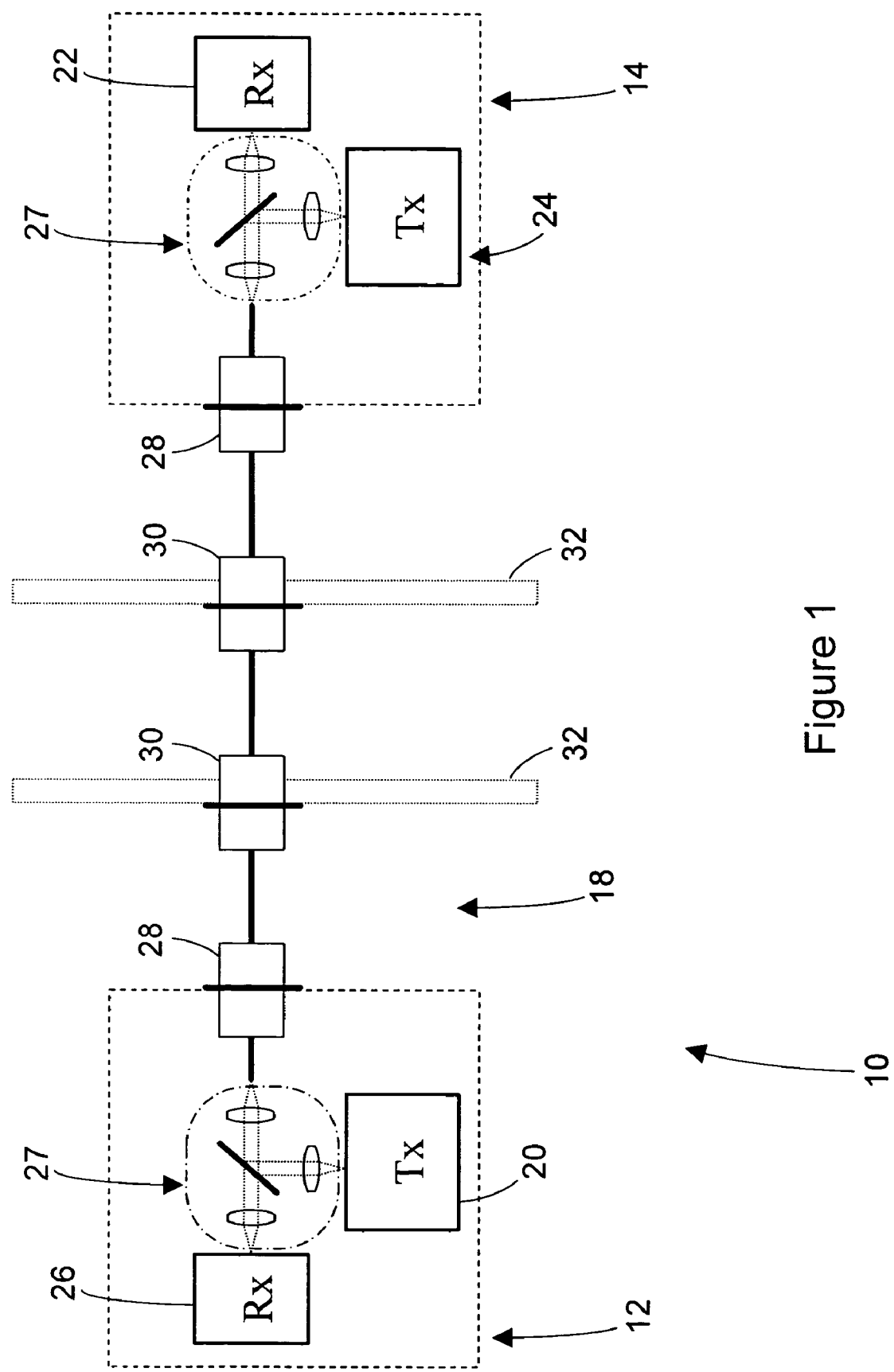
FIG. 1 illustrates a conventional bidirectional fiber optic system.

Referring to the accompanying drawings in which like reference numbers indicate like elements, FIG. 1 illustrates a conventional bidirectional fiber optic system. Generally, the coupler assemblies of the illustrated system each include a beam-splitter and three lenses to couple optical signals to and from the coupler. Optionally, the coupler assemblies that are shown can be implemented in fiber.

The system 10 includes two optical devices 12 and 14 and a link with one fiber 18. The device 12 has a transmitter 20 for sending optical signals (i.e. electromagnetic radiation or "light") to a receiver 22, which is located in the device 14, while the device 14 has another transmitter 24 for sending optical signals to another receiver 26 in device 12. The signals are coupled to/from the transmitters 20 and 24 and the receivers 22 and 26 via coupler assemblies 27 and pass in/out of the transceiver package via connectors 28 on each of the devices 12 and 14. Thus, each of the devices necessarily includes one port at device connector 28. The signals travel along the fiber 18 independent of which transmitter 20 or 24 is transmitting the signal. The fiber 18 also necessarily includes a number of connectors 30 that allow, among other things, the fiber 18 to be mechanically and optically coupled to the transceivers 12 and 14. The connectors 30 also allow the fiber 18 to pass through bulkheads 32 and other obstructions between the devices 12 and 14. Thus, generally, for the required fiber 18 of the system 10 the system 10 must include connectors 28 and 30 along with, of course, the fiber 18 itself. Accordingly, the higher the number of fibers 16 and 18 required for the system 10, the higher the weight and complexity of the system 10. Bidirectional links are preferred because they require half the fibers and connectors of conventional unidirectional links.

Figure 2:
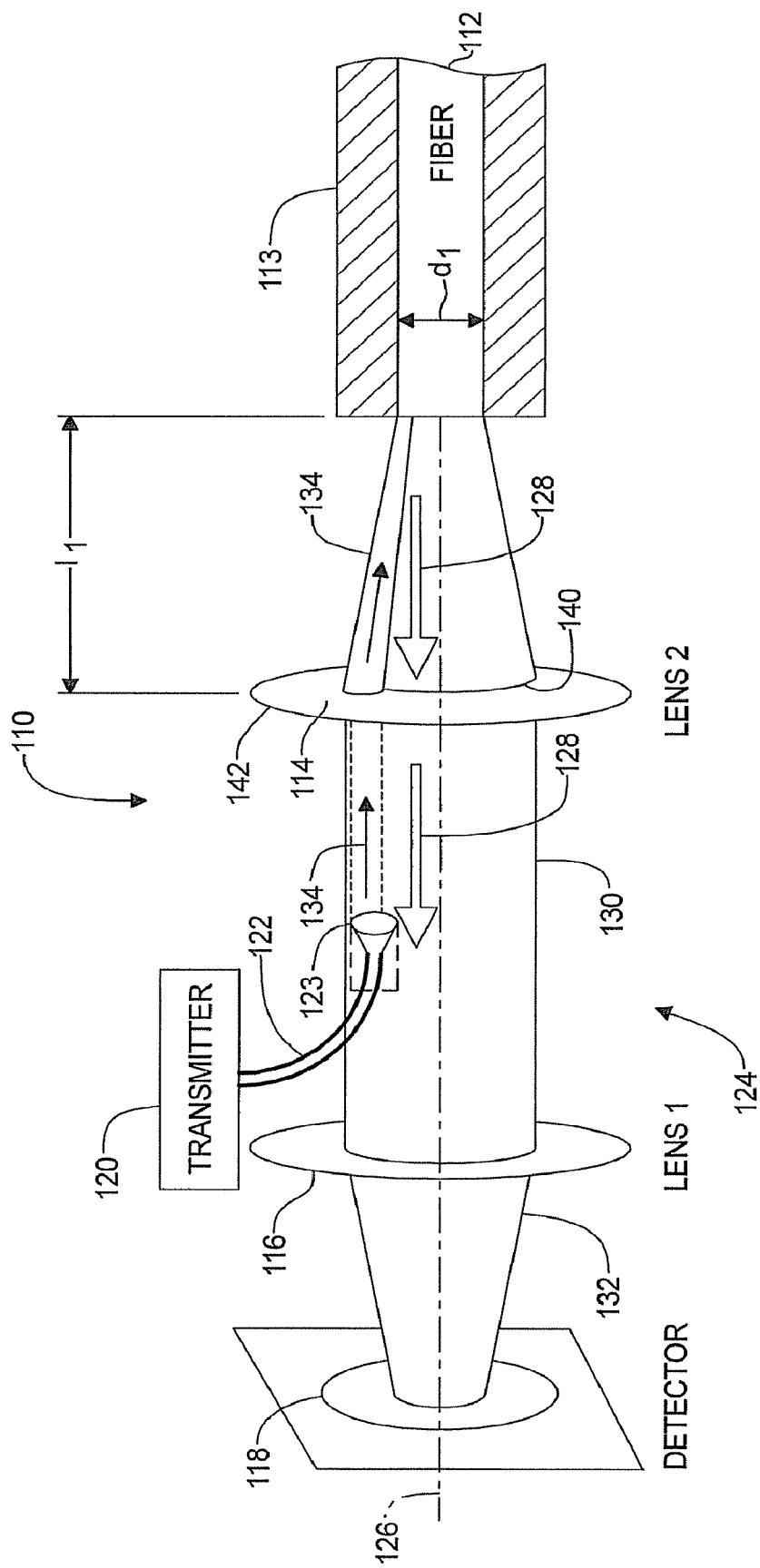
FIG. 2 illustrates a fiber optic transceiver constructed in accordance with the principles of the present disclosure.

FIG. 2 illustrates an optical source/detector (or transceiver) 110 constructed in accordance with the principles of the present disclosure. The exemplary optical source/detector 110 is shown as being coupled to an optical fiber 112 (shown with cladding 113) and includes a first objective lens 114, a second lens 116, an optical detector 118, a transmitter 120, a fiber pigtail 122, a collimating lens 123, and a housing to maintain the alignment between the various optical components. Generally, the components 114, 116, 118, 120, 123, and 122 serve to couple electromagnetic radiation (i.e. "light") from the fiber 112 to the detector 118 (in a first direction) and serve to couple light from the transmitter 120 to the fiber 112 (in a second direction). Lenses 114 and 116 are spaced apart and define a collimated volume 124 between themselves. The lenses 114 and 116 also define a longitudinal axis 126 of the source/detector 110 that is co-located with the principal axis of the lenses 114 and 116. The fiber 112 and the detector 118 are held in spaced apart relationship with the lenses 114 and 116, respectively, toward opposite ends of the source/detector 110. The proximal end of the fiber pigtail 122 is coupled to the transmitter 120. The distal end of the fiber pigtail 122 with collimating lens 123 is held in a fixed relationship to the objective lens 114 such that the fiber pigtail 122, with collimating lens 123, directs the light upon the lens 114 and, preferably, upon an outer periphery of the objective lens 114. Preferably, the radiation from collimating lens 123 is substantially parallel to the longitudinal axis 126 (see FIG. 2).

In operation, an optical signal 128 (i.e. electromagnetic radiation or "light") exits the fiber 112, enters the source/detector 110, and diverges about an axis generally parallel to the longitudinal axis 126. The divergence of the received light 128 as it enters the source/detector 110, and seen in FIG. 2, is generally how visible, or invisible, electromagnetic radiation behaves when it exits the end of an optical fiber such as the fiber 112 (shown with a diameter of "d1" and cladding 113) and is no longer guided by the fiber. Nonetheless, the received light 128 generally travels in the first direction until it encounters the lens 114. The lens 114 refracts most of the incident light 128 so that the light is collimated (or has very much less divergence) as it travels through the collimated volume 124 between the lenses 114 and 116. The received light 128 then encounters the lens 116 which again refracts the received light 128 into a converging cone 132 after the second lens 116 to focus the light upon the detector 118. The detector 118 (e.g. a photodiode that operates in the visible, near infrared, or infrared spectrum or an equivalent device) detects the received light 128 and preferentially generates an electric signal that is representative of the signal conveyed by the received light 128.

In the other direction, the source/detector 110 transmits optical signals to the fiber 112. The transmitter 120 (e.g. a light emitting diode, a laser, or an equivalent device) generates the outbound optical signal (i.e. transmitted light 134) which is then coupled into the fiber pigtail 122. The transmitted light 134 travels through the fiber pigtail 122 and exits from the collimating lens 123 at the distal end of the pigtail 122. The collimating lens 123 collimates the transmitted light 134 from the laser 120 (or fiber pigtail 122) with the received light 128. From the collimating lens 123, the transmitted light 134 encounters the first lens 114 (preferably the outer periphery of the first lens 114) and is thereby refracted and directed toward the fiber 112. Upon encountering the fiber 112, the transmitted light 134 begins traveling along the fiber 112.

The various components of the source/detector 110 are preferably arranged so that in the collimated volume 124 (between the collimating lens 123 and the first lens 114) the transmitted light 134 and the received light 128 are substantially parallel. The arrangement shown in FIG. 2 therefore allows the light 128 and 134 to focus on detector 118 and the fiber core 112 respectively.

Referring still to FIG. 2, further details of the paths that the received and transmitted light 128 and 134 take through the source/detector 110 are shown. For instance, the received light 128 exits the fiber 112 and begins diverging as it travels from the end of the fiber 112 to the objective lens 114. The received light 128 then encounters the objective lens 114 and is preferably refracted in such a manner that the received light 128 is collimated or no longer diverges (much) once it is beyond the objective lens 114. Thus, as the received light 128 leaves the objective lens 114 it travels in parallel with the longitudinal axis 126 of the source/detector 110. Upon encountering the second lens 116, the received light 128 is refracted again such that it converges on the detector 118 with an intensity almost the same as when the received light 128 left the fiber 112, having incurred minimal loss. Accordingly, the detector 118 will perform more advantageously as it receives a higher signal level than it would have received with previously available devices.

In the other direction, the transmitted light 134 exiting the fiber pigtail 122 and collimator 123 diverges minimally until it encounters the lens 114. After passing through the lens 114 and being refracted accordingly, the transmitted light converges as it travels across the space between the lens 114 and the fiber 112. As shown in FIG. 2, the received light 128 is incident on a first portion 140 of the objective lens 114. The transmitted light 134 is incident on another portion 142 of the objective lens 114 that is preferably on the outer periphery of the lens 114, or on the outer periphery of the first portion 140. Further, as shown, the two portions 140 and 142 of the objective lens 114 on which the received and transmitted light 128 and 134 are incident may overlap.

Because the received light 128 has expanded when it reaches the objective lens 114, any shadow cast by the fiber pigtail 122 and collimating lens 123 on the detector 118 (and second lens 116) will reduce the overall intensity of the received light 128 at the detector 118 by a fraction of the amount that the shadow would have reduced the intensity had the received light 128 not been expanded. In one embodiment the reduction in intensity of the received light 128 at the detector is predicted to be a mere 0.5 dB. Moreover, because the fiber pigtail 122 and collimating lens 123 direct the transmitted light 134 almost directly away from the detector 118, very little of the transmitted light 134, if any, is reflected toward the detector 118. Thus, even though the collimated source (consisting of fiber pigtail 122 and collimating lens 123) and the detector 118 share a common port (the coupling with the fiber 112) to transmit and receive signals, the dark current of the detector 118 can be lower than with previous devices and the transmitted signal-to-noise ratio and/or bandwidth can be higher. The fiber pigtail 122 could be configured so that the transmitted light 134 is incident on the objective lens 114 adjacent to, or spaced apart from, the portion 140 where the received light 128 is incident (provided that the objective lens 114 is able to direct the transmitted light 134 to the fiber 112).

To assemble the source/detector 110 shown in FIG. 2, a housing (not shown) is fabricated to mechanically couple the fiber 112 to the housing. In addition, the housing holds the lens 114 spaced apart from the end of the fiber 112 by the distance "l1" which is selected such that the light exiting from the fiber 112 will expand to no more than about the size of the lens 114 after traveling through the distance "l1". The housing also holds the second lens 116 far enough from the first lens 114 such that the fiber pigtail 122 and collimating lens 123 can be inserted between the two lenses 114 and 116. Of course, the housing also holds the detector 118 and the second lens 116 spaced apart by a distance that is selected such that the intensity of the received light 128 will be about the same at the detector 118 as it was when it exited the fiber 112. In addition, the housing preferably ensures that the fiber 112, the two lenses 114 and 116, and the detector 118 lie along a common axis, which is coincident with the principal axes of the lenses 114 and 116. Also, the housing ensures that the fiber pigtail 122 and collimating lens 123 assembly is oriented so as to direct the transmitted light 134 onto the portion 142 of the objective lens 114 (and subsequently from there to the fiber 112). Of course, the fiber pigtail 122 can lead out of the housing to be coupled to an external light source such as transmitter 120. With the source/detector 110 assembled in such a manner, light from the port (e.g. received light 128) illuminates and is collimated by the lens 114 and collimated light from the lens (e.g. transmitted light 134) is focused into the port by the lens 114. Also, preferably, a second portion of the lens 114 is coupled with a collimated signal from an optical source (e.g. transmitted light 134). The coupling of the lens 114 with the port, and with the source, can be done in such a manner that the first portion 140 and the second portion 142 of the lens 114 complement each other.

In view of the foregoing, it will be seen that the several advantages of the disclosure are achieved and attained. In particular, bidirectional optical couplers and transceivers have been provided that can possess increased signal-to-noise ratios or even higher bandwidths than previously available transceivers. Moreover, the devices and methods provided by the present disclosure can result in a lower dark current associated with the detector because the transmitted light does not reflect toward the detector. Also, because the devices allow bidirectional optical communications with a single unitary port, the number of connectors and fibers required for a bidirectional communication link is greatly reduced. Therefore, the present disclosure provides a more efficient single wavelength method to implement bidirectional communications.

The embodiments were chosen and described in order to best explain the principles of the disclosure and its practical application to thereby enable others skilled in the art to best utilize the disclosure in various embodiments and with various modifications as are suited to the particular use contemplated.

As various modifications could be made in the constructions and methods herein described and illustrated without departing from the scope of the disclosure, it is intended that all matter contained in the foregoing description or shown in the accompanying drawings shall be interpreted as illustrative rather than limiting. Thus, the breadth and scope of the present disclosure should not be limited by any of the above-described exemplary embodiments, but should be defined only in accordance with the claims and their equivalents.

What is claimed is:

1. An optical coupler comprising:
an optical port;
an objective lens with a principal axis, the objective lens having a first portion and a second portion about a periphery of the first portion and laterally offset from the first portion, the objective lens being spaced apart from the optical port along the principal axis, the first portion of the objective lens being disposed coaxially with the objective lens and optically coupled with the optical port to receive only a first optical signal;
an optical source optically coupled with the second portion of the objective lens, the optical source arranged along an axis parallel to the principal axis of the objective lens, and having a collimating lens disposed generally parallel to the principal axis but laterally offset from the principal axis and aligned with said second portion of the objective lens, the collimating lens being adapted to transmit a second optical signal to the objective lens along a path generally parallel to the principal axis but laterally offset from the principal axis, the objective lens being adapted to optically couple only the second optical signal to the optical port by refracting the second optical signal using only the second portion of the objective lens;

an optical detector optically coupled with the second portion of the objective lens, and arranged along an axis that is coincident with and parallel to the principal axis of the objective lens, to receive the first optical signal; and wherein the first portion and the second portion of the objective lens overlap.

2. The optical coupler of claim 1, wherein the optical source comprises a laser, a fiber pigtail optically coupled with the laser, and the collimating lens, with the collimating lens being optically coupled with the fiber pigtail.

3. The optical coupler of claim 1, wherein the objective lens has a focal distance, the optical port and the objective lens being spaced apart by the focal distance.

4. The optical coupler of claim 1, wherein the optical source further comprises a laser adapted to generate the second optical signal.

5. The optical coupler of claim 1, wherein the objective lens is a first lens, the coupler further comprising a second lens being optically coupled with the first lens and being optically coupled with the detector.

6. The optical coupler of claim 5, wherein the first optical signal has a first width at the optical port, a second width at the first lens and at the second lens, and a third width at the detector.

7. The optical coupler of claim 6, wherein the first width and the third width are about equal.

8. The optical coupler of claim 6, wherein the second width is larger than the first width.

9. An optical transceiver comprising:

an optical port;

a first objective lens with a first principal axis, the first objective lens having a first portion and a second portion disposed about a periphery of the first portion, the first objective lens being spaced apart from the optical port along the first principal axis, the first portion of the first objective lens being optically coupled with the optical port to receive a first optical signal that travels in a first direction;

a second objective lens with a second principal axis, the first objective lens and the second objective lens defining a longitudinal axis of the optical transceiver and the first principal axis and the second principal axis are co-located with the longitudinal axis of the optical transceiver, the second objective lens being optically coupled with the first optical lens to receive at least a portion of the first optical signal;

an optical source;

an optical pigtail that optically couples the optical source with the second portion of the first objective lens;

the optical source having a collimating lens arranged along an axis parallel to the principal axis of the first objective lens but laterally offset from the principal axis of the first objective lens so as to be co-linear with the second portion of the first objective lens, and the collimating lens being adapted to transmit a second optical signal only in a second direction axially opposite to the first direction to the first objective lens along a path that is generally parallel to, but laterally offset from, the principal axis of the first objective lens, only the second portion of the first objective lens being adapted to optically couple the second optical signal to the optical port; and an optical detector optically coupled in parallel with the second portion of the second optical lens, the optical detector arranged along an axis that is parallel with the principal axis of the objective lens to receive the first and second optical signals.

10. The optical transceiver of claim 9, wherein the optical source further comprises a laser adapted to generate the second optical signal.

11. The optical transceiver of claim 9, wherein the first optical signal has a wavelength in the range including the wavelengths of visible electromagnetic radiation and invisible infrared electromagnetic radiation.

12. A method of receiving a first optical signal and of transmitting a second optical signal, the method comprising:

spacing apart an objective lens and an optical port along a principal axis of the objective lens, the objective lens having a first portion and a second portion arranged circumferentially about a periphery of the first portion;

overlapping the first portion of the objective lens and the second portion of the objective lens;

optically coupling the first portion of the objective lens with the optical port to receive the first optical signal such that the first optical signal is transmitted only along, and parallel to, the principal axis;

optically coupling an optical source with the second portion of the objective lens, the optical source being adapted to use a collimating lens arranged generally parallel to the principal axis, but offset laterally from the principal axis, to transmit the second optical signal to the objective lens, the second optical signal being transmitted along a path that is parallel to the principal axis but laterally offset from the principal axis so as to impinge only the second portion of the objective lens, only the second portion of the objective lens being adapted to optically couple the second optical signal to the optical port by refraction of the second optical signal caused by the second portion of the objective lens; and detecting the first optical signal by optically coupling a detector along an axis coincident with and parallel to the principal axis of the objective lens.

13. The method of claim 12, wherein said optically coupling an optical source with the second portion of the objective lens further comprises using a fiber pigtail optically coupled to the collimating lens.

* * * * *